United States Patent
Muck et al.

(10) Patent No.: US 8,182,015 B2
(45) Date of Patent: May 22, 2012

(54) REAR VEHICLE SEAT RELEASE AND CARRYING HANDLE

(75) Inventors: Todd Rupert Muck, Fowlerville, MI (US); John Fredrik Runske, Howell, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 228 days.

(21) Appl. No.: 12/536,179

(22) Filed: Aug. 5, 2009

(65) Prior Publication Data

US 2011/0031773 A1    Feb. 10, 2011

(51) Int. Cl.
*B60N 2/015* (2006.01)

(52) U.S. Cl. .................. 296/65.03; 297/336; 248/503.1

(58) Field of Classification Search ............... 297/463.1, 297/335, 336; 296/63, 65.01, 65.03, 65.05; 292/201; 248/503.1
See application file for complete search history.

(56) References Cited

U.S. PATENT DOCUMENTS

| | | | |
|---|---|---|---|
| 5,730,412 A * | 3/1998 | Shrock | 248/429 |
| 5,765,894 A * | 6/1998 | Okazaki et al. | 296/65.03 |
| 5,951,086 A * | 9/1999 | Hoshino et al. | 296/65.03 |
| 5,997,069 A | 12/1999 | Coffey et al. | |
| 6,039,401 A * | 3/2000 | Rus | 297/378.13 |
| 6,155,626 A * | 12/2000 | Chabanne et al. | 296/65.03 |
| 6,345,856 B1 | 2/2002 | Minai | |
| 7,213,881 B2 * | 5/2007 | Kim et al. | 297/336 |
| 7,222,907 B2 * | 5/2007 | Lutzka et al. | 296/65.03 |
| 7,785,053 B2 * | 8/2010 | Hudson | 410/105 |
| 7,914,077 B2 * | 3/2011 | Linkner et al. | 297/331 |
| 2004/0119312 A1 * | 6/2004 | Mack et al. | 296/65.09 |
| 2007/0102976 A1 * | 5/2007 | Ramsey et al. | 297/248 |
| 2009/0015049 A1 * | 1/2009 | Kanamori et al. | 297/340 |

* cited by examiner

*Primary Examiner* — Glenn Dayoan
*Assistant Examiner* — Pinel Romain
(74) *Attorney, Agent, or Firm* — Gifford, Krass, Sprinkle, Anderson & Citkowski, P.C.

(57) ABSTRACT

The present invention discloses a removable rear seat assembly for use in a motor vehicle having a passenger compartment and a vehicle floor. A seat frame is mounted to the vehicle floor. A release mechanism is provided operatively connecting the seat frame to the vehicle floor as to prevent movement of the seat frame. A release handle is mounted to a rear of the seat frame and is connected to the release mechanism for purposes of activating the release mechanism. The release handle may also be used as a carrying handle allowing for increased maneuverability of the seat frame after removal. The seat frame is removable from the passenger compartment upon a downward pulling and upward rotation of the release handle. This specific movement requirement prevents the inadvertent release of the seat frame from the vehicle floor. The release handle is prevented from an immediate rotation upwards preventing a vehicle occupant from activating the release mechanism by kicking or lifting the release handle. The release handle is freely rotatable downwards to the vehicle floor creating a breakaway feature allowing a vehicle occupant to step on or kick the release handle without activating the release mechanism. These safety features prevent the inadvertent release of the seat frame.

11 Claims, 4 Drawing Sheets

REAR VEHICLE SEAT RELEASE AND CARRYING HANDLE

FIELD OF THE INVENTION

The present invention relates generally to a removable seat assembly for use in motor vehicles, and in particular to a removable rear seat assembly having a carrying and release handle configured to prevent inadvertent release of a vehicle seat assembly.

BACKGROUND OF THE INVENTION

It is known in the art for rear second and third row vehicle seats to be removed from a passenger compartment to increase cargo space, and to re-install those seats to provide for increased passenger seating. Most van and mini-van type vehicles provide for removable rear seats to accommodate different uses for such vehicles.

Such removable seats typically have a release handle operatively installed to remove the vehicle seat from the passenger compartment of the vehicle. Such release handles may be a strap, lever or a generally U-shaped handle projecting rearwardly from the back of the seat. The release handles generally connect to a latching and release mechanism which attaches the vehicle seat to a vehicle floor. When the handle is pulled, the latching and release mechanism releases the vehicle seat thereby allowing the user to remove the vehicle seat from the passenger compartment. The release handle can be inadvertently unlatched.

Accordingly, it is desirable to have to a removable rear seat assembly having a release handle configured to prevent inadvertent release and unlatching of a vehicle seat assembly.

SUMMARY OF THE PRESENT INVENTION

The present invention provides a removable rear seat assembly which overcomes the above-mentioned disadvantages of previously known rear seat assembly designs for a motor vehicle. The motor vehicle having a passenger compartment and a vehicle floor. A seat frame is mounted to the vehicle floor. A release mechanism operatively connects the seat frame to the vehicle floor as to prevent movement of the seat frame. A release handle mounted to a rear of the seat frame is connected to the release mechanism for purposes of activating the release mechanism. The release handle may also be used as a carrying handle allowing for increased maneuverability of the vehicle seat after removal. The seat frame is removable from the passenger compartment upon a downward pulling and upward rotation of the release handle. This specific movement requirement prevents inadvertent release of the seat frame from the vehicle floor. These safety features prevent the inadvertent release of the seat frame.

The present invention provides a removable rear seat assembly which overcomes the above-mentioned disadvantages of previously known rear seat assemblies. A removable rear seat assembly a motor vehicle typically includes a seat frame having a release handle mounted to a rear of the seat frame connected to the release mechanism for purposes of activating the release mechanism and permitting removal of the seat assembly, or seat frame. The seat frame is removable from the passenger compartment upon a downward pulling and upward rotation of the release handle. This specific movement requirement prevents the inadvertent release of the seat frame from the vehicle floor.

Figure 1:
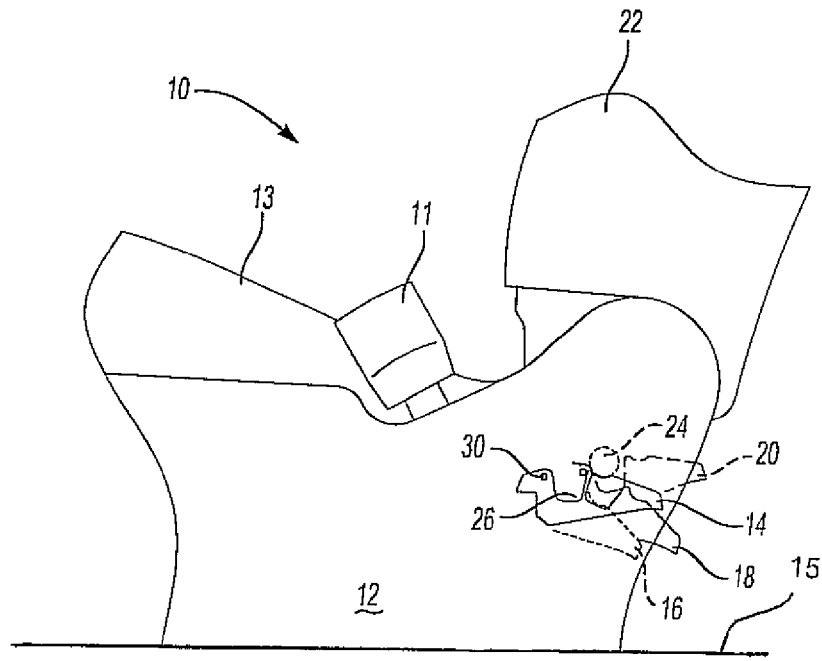
FIG. 1 is a side perspective view of a rear seat assembly and a release handle.

FIG. 1 is a side perspective view of a rear seat assembly and a release handle 14. The seat assembly, located generally at 10, includes a seat back 22, cushion 13, seat belt buckle 11 and seat frame 12. The release handle 14 is mounted at the rear of the seat frame 12. The release handle 14 is depicted showing the continuous downward pulling and upward rotation required to remove the seat assembly 10. Initial downward pulling of the release handle 14 is generally located at down position 16. Upward rotation of the release handle 14 is generally located at middle position 18. Final upward rotation of the release handle 14 is located at final upward position 20. The position of upward handle 20 indicates the position required to remove the seat assembly 10.

Figure 2:
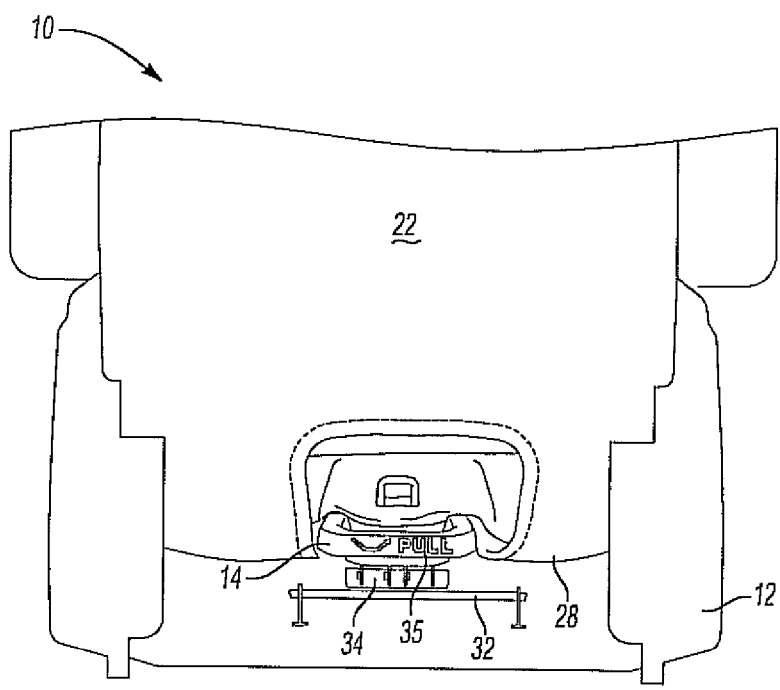
FIG. 2 is a rear perspective view of a rear seat assembly with an installed release handle.

FIG. 2 is a rear perspective view of the rear seat assembly 10 with installed release handle. The seat assembly 10 includes a seat back 22 and seat back covering 28. The seat assembly 10 also includes seat frame 12. The installed release 14 handle may optionally include photographic or written operating instructions.

Figure 3:
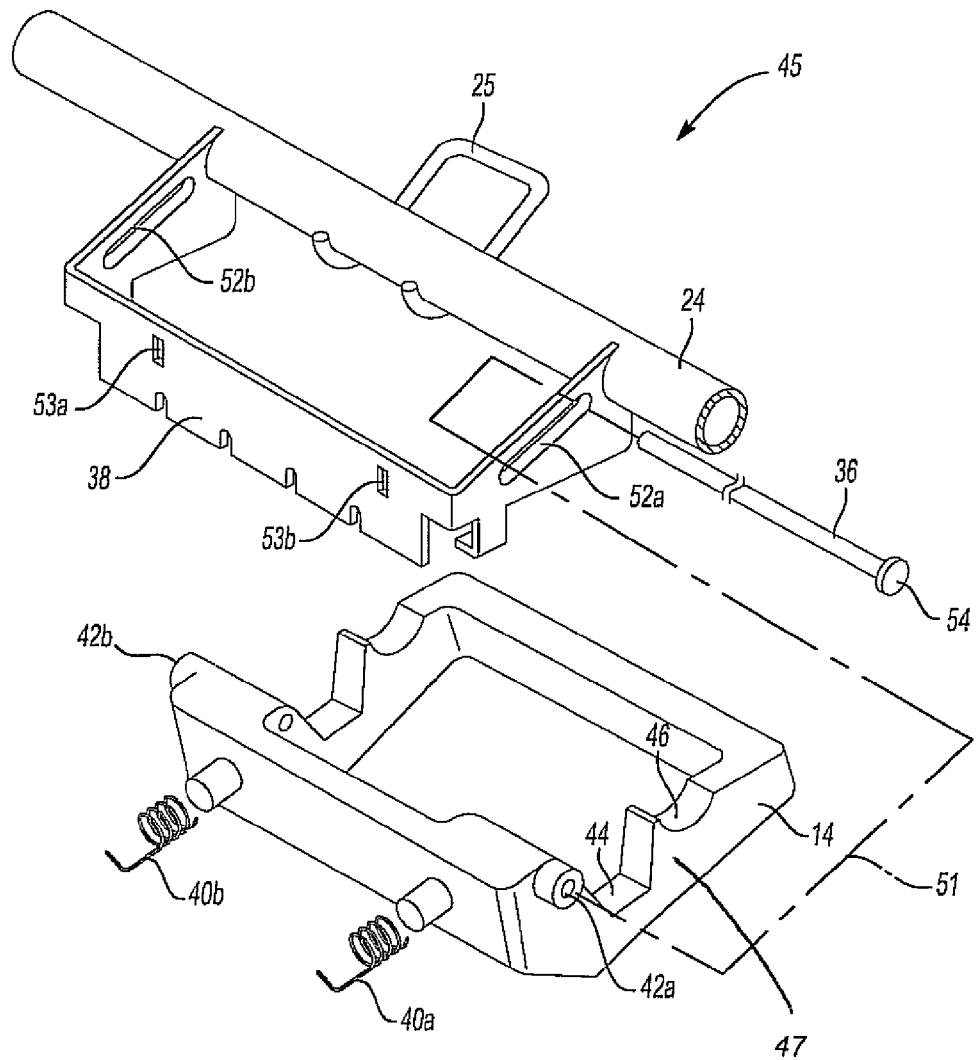
FIG. 3 is an exploded view of a release handle.

FIG. 3 shows an exploded view of the release handle mounting assembly 45. The release handle 14 includes a first indentation 44, a second indentation 46, receiving holes 42a, 42b and at least two springs 40a, 40b. The first indentation 44 and the second indentation 46 are positioned on the bracket portion 47 on the handle 14. The mounting assembly 45 further includes a bracket 38 adapted to hold and operatively connect the release handle 14 to the seat frame 12 (as shown in FIG. 2). The bracket 38 includes at least two slots 52a, 52b configured to receive a retaining rod 54. As depicted by line 51, release handle 14 rests inside bracket 38 and retaining rod 54 inserts through slot 52a into receiving hole 42a and through the release handle 14. The retaining rod 54 then exits release handle 14 through the receiving hole 42b and through slot 52b. An optional E-clip, or other fastening means, can be added to the retaining rod 54 to better secure retaining rod 54. Such a configuration pivotally and slidably connects the release handle 14 to the bracket 38. The release handle 14 is then freely able to pivot with respect to the retaining rod 54 while simultaneously sliding along the length of slots 52a, 52b. The slots 52a, 52b and the retaining rod 54 allow for the downward pulling and upward rotation required to activate the release mechanism thereby allowing for removal of the vehicle seat assembly 10.

The springs 40a, 40b, when assembled, connect to receiving holes 53a, 53b. The spring 40a, 40b and receiving hole 53a, 52b assembly creates a self-returning mechanism of the release handle 14. After the user has completed seat removal or after release handle has been manipulate, the release handle 14 automatically returns to its resting position from the constant tension created by springs 40a, 40b.

Bracket 38 is attached to support member 24 which attaches to the seat assembly 10 (as depicted in FIGS. 1 and 2). Bracket 38 may be welded, glued or otherwise attached to the support member 24. When the bracket 38 and the release handle 14 are fully assembled and while at rest, support member 24 sits in first indentation 44. First indentation 44 is intended to prevent slight movements of the release handle 14 when installed.

The slots 52a, 52b and the retaining rod 54 allow for the downward pulling and upward rotation required to activate the release mechanism thereby allowing for removal of the vehicle seat assembly 10. Once the downward pulling process is complete, the support member 24 will rest in first indentation 44. First indentation 44 provides a locus for which to rotate release handle 14 on. Once support member 24 is resting within first indentation 44, user is able to rotate release handle 14 upwards thereby activating release and allowing the user to remove the seat assembly 10 from the passenger compartment of the vehicle.

Figure 4:
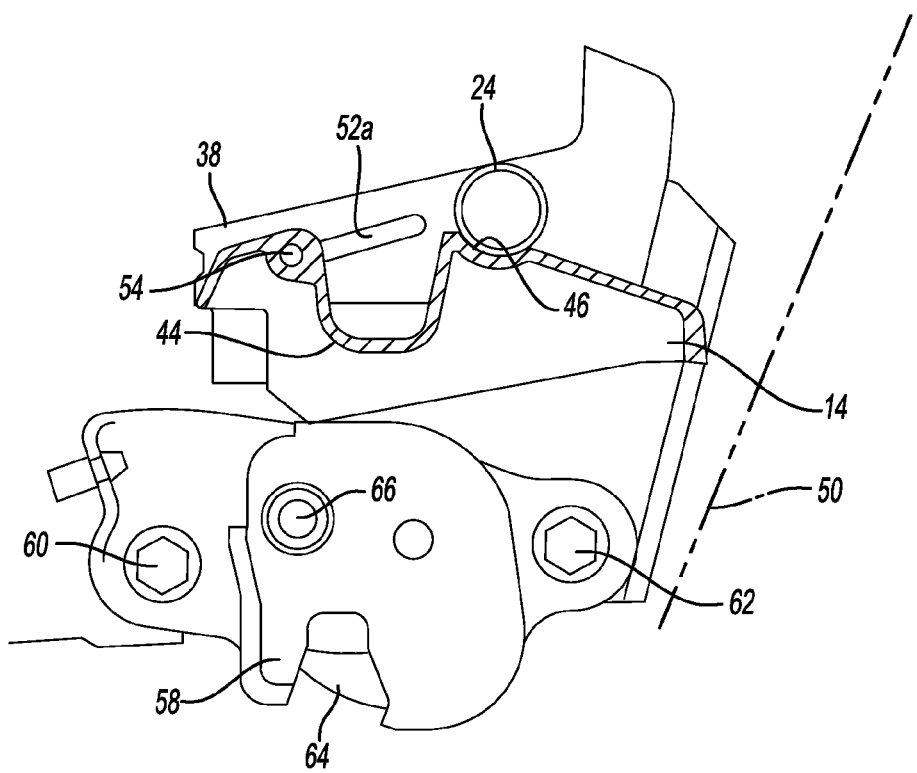
FIG. 4 is a side cross sectional view of an installed release handle at a resting position.
Figure 5:
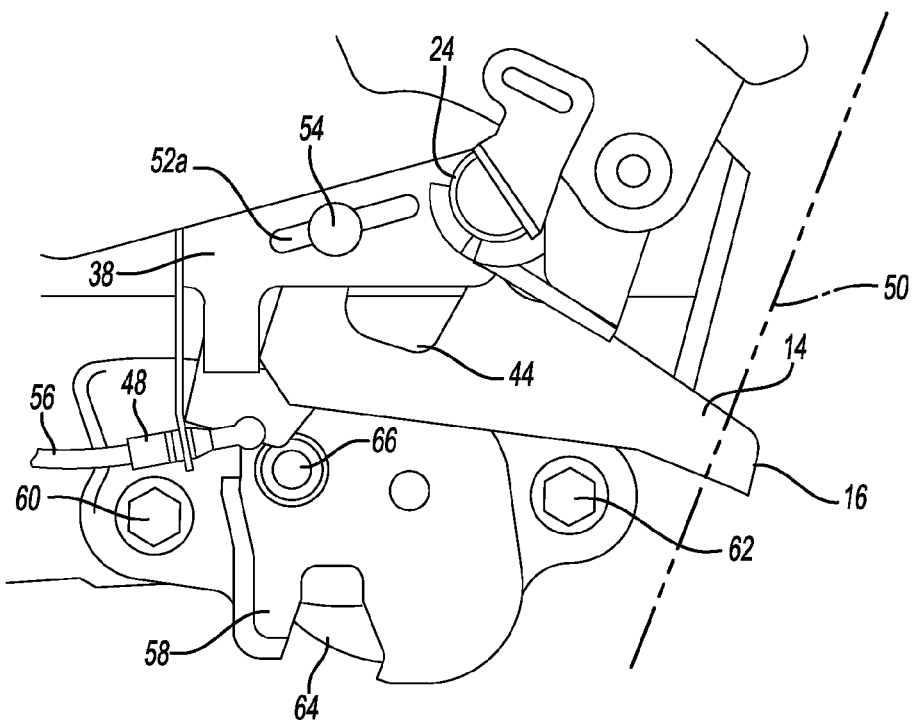
FIG. 5 is a side cross sectional view of an installed release handle demonstrating a downward pulling movement.
Figure 6:
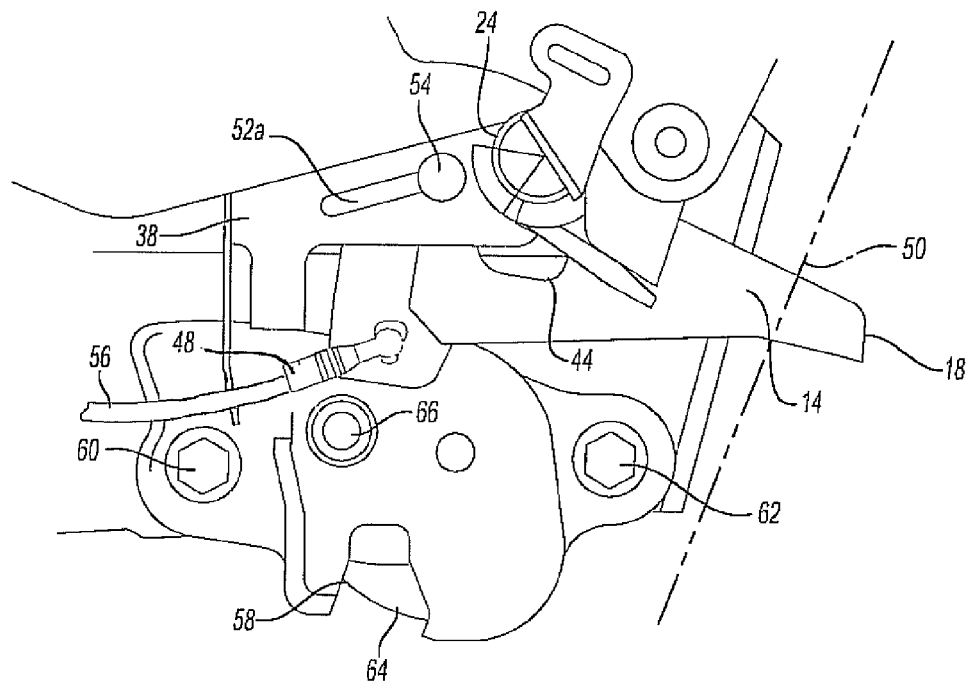
FIG. 6 is a side cross sectional view of an installed release handle demonstrating an upward rotation movement.

FIGS. 4-6 demonstrate the downward pulling and upward rotation movement required to release the seat assembly 10 from a floor of the vehicle. FIG. 4 is a side cross sectional view of an installed release handle 14 at a resting position. Bracket 38 is shown having retaining rod 54 and slot 52a. Release handle 14 is shown with second indentation 46 and first indentation 44 with support member 24 resting inside first indentation 44. Retaining rod 54 pivotally connects release handle 14 to bracket 38. FIG. 4 further includes a latching mechanism 64 along with bots 60, 62 and attaching member 66.

Seat trim outline 50 demonstrates the area which the release handle 14 is designed to stay behind. The release handle 10 is purposely housed at rest well behind the seat trim outline 50. Housing the release handle 14 behind the seat trim outline 50 eliminates and trip hazard the release handle 14 may create. Housing the release handle 14 behind the seat trim outline 50 also improves appearance and styling of the overall seat assembly 10.

FIG. 5 depicts a side cross sectional view of an installed release handle demonstrating a downward pulling movement. Bracket 38 is shown having retaining rod 54 and slot 52a. Release handle 14 is shown with first indentation 44 and second indentation 44 with support member 24 resting inside second indentation 44. Retaining rod 54 pivotally connects release handle 14 to bracket 38. FIG. 4 further includes a latching mechanism 64 along with hots 60, 62 and attaching member 66. A cable 56 and cable connector 48 are also depicted. Generally, seat assembly 10 includes a plurality of cables connect to the release handle 14. When the release handle 14 completes the required downward pulling and upward rotation, sufficient tension is placed on the cables to release the seat assembly 10 from the vehicle floor 15.

The initial downward pulling movement is depicted at down position 16. Down position 16 also generally depicts a breakaway movement. The release handle 14 is also freely rotatable downwards to the vehicle floor 15 creating a breakaway feature allowing a vehicle occupant to step on the release handle 14 without damaging the release handle 14 and preventing inadvertent release the seat frame.

FIG. 6 shows a side cross sectional view of an installed release handle 14 demonstrating an upward rotation movement. Bracket 38 is shown having retaining rod 54 and slot 52a. Release handle 14 is shown with second indentation 46 and second indentation 44 with support member 24 resting inside first indentation 44. Retaining rod 54 pivotally connects release handle 14 to bracket 38. FIG. 6 further includes a latching mechanism 64 along with bolts 60, 62 and attaching member 66. A left cable 56 and left cable connector 48 are shown and not depicted are a right cable and right cable connector. Generally, seat assembly 10 includes a plurality of cables connect to the release handle 14. When the release handle 14 completes the required downward pulling and upward rotation, sufficient tension is placed on the cables to release the seat assembly 10 from the vehicle floor. The start of the upward rotation is generally located at position 18. The support member 24 is just starting to meet up with second indentation 44. When release handle 14 is generally located at 18, the cables 56 do not have sufficient tension to active the release or other latching means.

Figure 7:
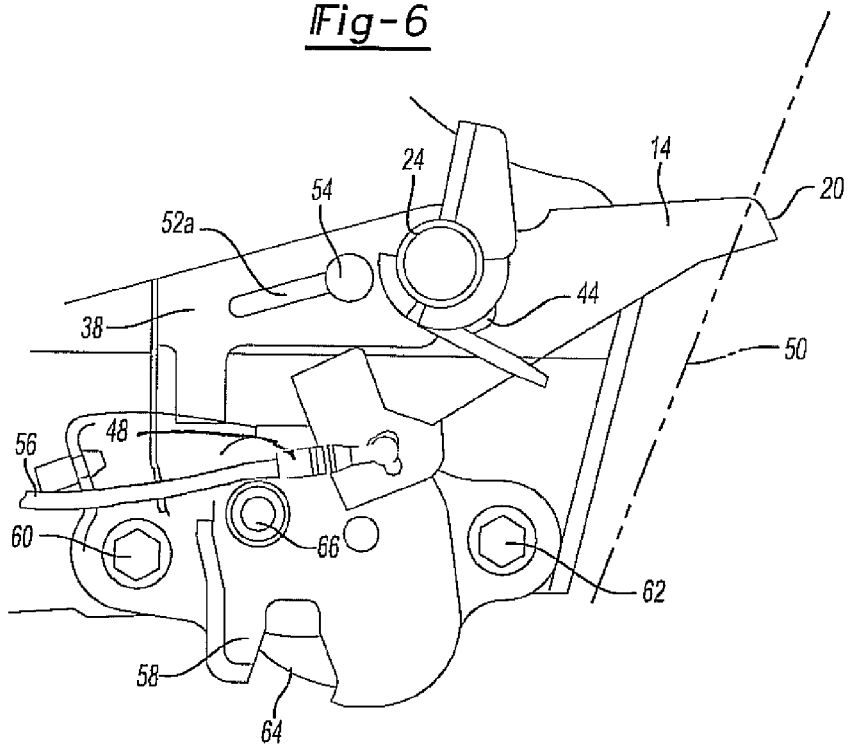
FIG. 7 is a side cross sectional view of an installed release handle demonstrating a further upward rotation movement and final position for activation of the release mechanism.

FIG. 7 depicts a side cross sectional view of an installed release handle demonstrating a further upward rotation movement and final position for activation of the release mechanism. Bracket 38 is shown having retaining rod 54 and slot 52a. Release handle 14 is shown with first indentation 44 and second indentation 44 with support member 24 resting inside second indentation 44. Retaining rod 54 pivotally connects release handle 14 to bracket 38. FIG. 7 further includes a latching mechanism 64 along with bots 60, 62 and attaching member 66. A cable 56 and cable connector 48 are also depicted. Generally, seat assembly 10 includes a plurality of cables connect to the release handle 14. When the release handle 14 completes the required downward pulling and upward rotation, sufficient tension is placed on the cables to release the seat assembly 10 from the vehicle floor 15. FIG. 7 depicts the completed required downward pulling and upward rotation movement to release the seat assembly 10. When the release handle 14 is generally positioned at position 20, the cables 56 have sufficient tension to release any latch or other connecting means. At this point, a user may easily remove the seat assembly 10 from a passenger compartment. Upon removal, the user may use the release handle 14 as a carrying handle. Using release handle 14 as a carrying handle improves maneuverability and minimizes strain on the mover of the seat assembly 10.

Additionally, the release handle 14 may alternatively be configured to tension the cables 56 to remove the seat assembly 10. Seat assembly 10 and seat frame 12 may be alternatively arranged to allow for a upward pulling and downward rotation to tension cables 56 to remove seat assembly 10. The seat assembly 10 may easily be modified to accommodate a reverse motion and therefore the contents of this application should not be limited to a downward pulling and upward rotation movement.

In view of the teaching presented herein, it is to be understood that numerous modifications and variations of the embodiments disclosed will be readily apparent to those of skill in the art. Likewise, the exact shape, composition and the like of the seat assembly can be altered without extending beyond the scope of the invention. The foregoing is illustrative of specific embodiments of the invention, but is not meant to be a limitation upon the practice thereof. It is the following claims, including all equivalents, which define the scope of the invention.

We claim:

1. A rear seat assembly for a vehicle having a passenger compartment and a floor, said rear sear assembly comprising:
a seat frame mounted to a floor, the seat frame having a slot;
a release mechanism operatively connecting said seat frame to said floor;
a retaining rod connected to said seat frame;
a release handle having a bracket portion, said bracket portion supported for pivotable and slidable movement to the slot of said seat frame, said release handle connected to said release mechanism to activate the release mechanism, said bracket portion having a first indentation and a second indentation, said first indentation holding said release handle in a locked position, said release handle slidable from the first position to rotate about said retaining rod to a second position within the second indentation thereby activating the release mechanism; and at least one cable operatively connected to said release handle;

said seat frame being freely removable from said vehicle upon activation of said release mechanism thereby preventing inadvertent release of said seat frame.

2. The rear seat assembly of claim 1, wherein said cables of said release mechanism further connect to a plurality of latches securing said seat frame to said floor.

3. The rear seat assembly of claim 2, wherein said downward pulling then upward motion of said release handle tensions said cables thereby releasing said plurality of latches and releasing said seat frame from said floor.

4. The rear seat assembly of claim 1, wherein said release handle is pivotally mounted to said bracket portion by the retaining rod.

5. The rear seat assembly of claim 4, wherein said indentations are configured to accept said retaining rod allowing said release handle when pulled to slide along said indentations of said bracket portion.

6. The rear seat assembly of claim 1, wherein said release handle may optionally be used as a carrying handle for removing said seat frame from said passenger compartment.

7. The rear seat assembly of claim 5, wherein said release handle pivotally mounted in said bracket is freely rotatably downwards to said floor without activating said release mechanism to prevent inadvertent release of said seat frame.

8. The rear seat assembly of claim 7, wherein said release handle pivotally mounted in said bracket is prevented from rotating upwards without a first downward pulling thereby preventing inadvertent release of said seat frame.

9. The rear seat assembly of claim 8, wherein said release mechanism is only activated upon said downward pulling then an upward motion of said release handle thereby preventing inadvertent release of said seat frame.

10. The rear seat assembly of claim 5, wherein said release handle is further connected to said bracket by a plurality of return springs whereupon release of said release handle, the handle is pulled back into a recessed position by said return springs.

11. The rear seat assembly of claim 1, wherein said release handle may also be used as a carrying apparatus.

* * * * *

UNITED STATES PATENT AND TRADEMARK OFFICE
CERTIFICATE OF CORRECTION

PATENT NO. : 8,182,015 B2  
APPLICATION NO. : 12/536179  
DATED : May 22, 2012  
INVENTOR(S) : Todd Rupert Muck et al.

Page 1 of 1

It is certified that error appears in the above-identified patent and that said Letters Patent is hereby corrected as shown below:

At column 1, line 31, After have Delete "to"

At column 2, line 7, After assembly Insert -- in --

At column 2, line 8, Delete "a rear of the seat" Insert -- the rear seat --

At column 2, line 63, Delete "manipulate" and Insert -- manipulated --

At column 3, line 12, Delete "locus" Insert -- focus --

At column 3, line 13, After 14 Delete "on"

At column 3, line 27, Delete "bots" Insert -- bolts --

At column 3, line 33, After eliminates Delete "and"

At column 3, line 33, After hazard Insert -- of --

At column 3, line 33, After handle 14 Delete "may create"

At column 3, line 44, Delete "hots" Insert -- bolts --

At column 3, line 47, Delete "connect" Insert -- connected --

At column 3, line 57, After release Insert -- of --

At column 4, line 2, Delete "connect" Insert -- connected --

At column 4, line 9, Delete "active" Insert -- activated --

At column 4, line 19, Delete "bots" Insert -- bolts --

At column 4, line 22, Delete "connect" Insert -- connected --

At column 4, claim 1, line 57, Delete "sear" Insert -- seat --

At column 4, claim 1, line 58, After to Insert -- said --

At column 5, claim 1, line 2, Delete "the" Insert -- a --

Signed and Sealed this  
Twenty-sixth Day of February, 2013

Teresa Stanek Rea  
*Acting Director of the United States Patent and Trademark Office*